Oct. 25, 1932.                    W. E. HOKE                    1,884,973
                    SELF LOCKING COUPLED SCREW ELEMENTS
                         Original Filed Nov. 1, 1927
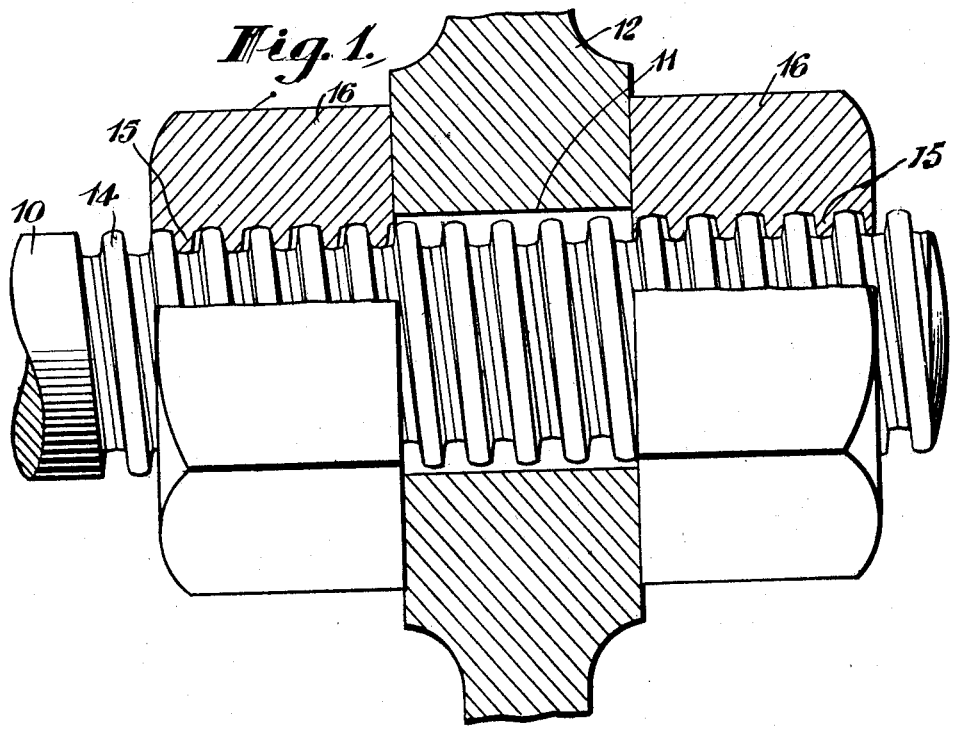
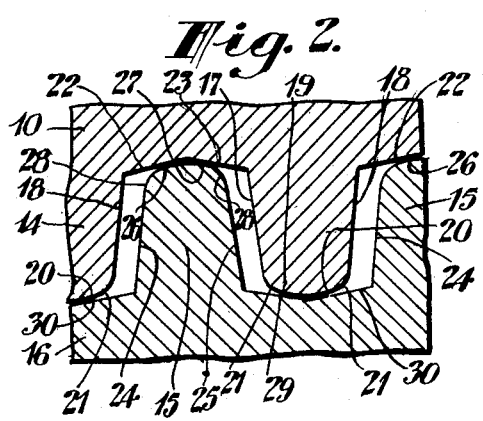
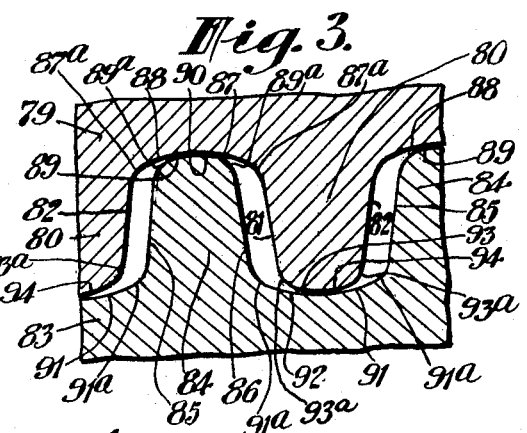
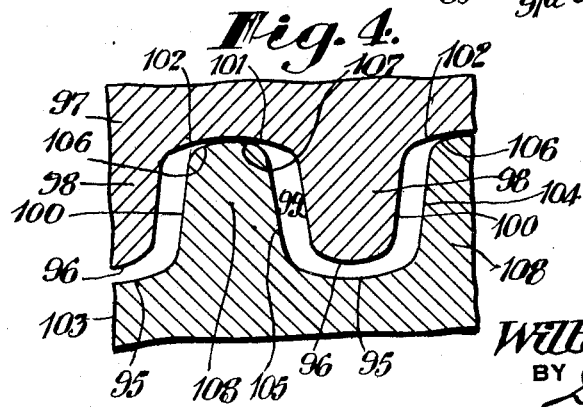
INVENTOR
William E. Hoke
BY
Davis Davis
ATTORNEYS Patented Oct. 25, 1932

1,884,973

UNITED STATES PATENT OFFICE

WILLIAM E. HOKE, OF BALTIMORE, MARYLAND, ASSIGNOR TO DARDELET THREAD-LOCK CORPORATION, OF NEW YORK, N. Y., A CORPORATION OF DELAWARE

SELF-LOCKING COUPLED SCREW ELEMENTS

Original application filed November 1, 1927, Serial No. 230,300. Divided and this application filed February 26, 1931. Serial No. 518,424.

This application is a division of my pending application Serial No. 230,300, filed November 1, 1927, which has matured into Patent No. 1,798,604, and relating to self-locking coupled screw elements such as bolts and nuts wherein the male and female threads are designed for self-locking engagement by crosswise displacement of a thread of one class relatively to a thread of the other class in either direction to bring co-acting locking surfaces into frictional engagement.

An important object of the present invention is to provide such a self-locking thread with an improved profile designed to render the thread easy to cut or form, reduce the wear upon the cutting tool, prevent the formation of burrs in cutting the thread, and prevent a cutting or biting action when the thread is brought into locking engagement with a companion thread.

Other objects of the invention will appear hereinafter.

In the drawing, Fig. 1 is a view partly in longitudinal section, showing one end of a bolt and nut assembly wherein two nuts are screwed on the same bolt thread against opposite faces of a work piece penetrated by the bolt, as in the case of one end of a stay-bolt and nut assembly;

Fig. 2, a detail sectional view showing male and female threads of the form illustrated on the bolt and nuts in Fig. 1 in neutral position; and Figs. 3 and 4 views similar to Fig. 2, showing two different forms of thread connections either of which may be substituted for the form of thread connection illustrated in Fig. 1.

While I have illustrated a situation in which a double acting thread lock is of advantage, it will be understood that my invention is not limited to the use which I have illustrated.

In Fig. 1 is shown an application of the invention to one end of a stay-bolt coupling. 10 designates the shank of the bolt which passes through an aperture 11 in a member 12, such as a tank wall, and has a male thread 14; and 15 designates the threads of each of two nuts 16 screwed on the bolt and bearing against opposite faces of the bolt-penetrated member 12. The threads of the two nuts are of identical cross-sectional form and pitch and are of the same pitch as the bolt thread 14.

The bolt thread 14, as more clearly shown in Fig. 2, is formed with two oppositely facing, helicoidal, abutment surface portions 17 and 18 in axial register and each making an abrupt angle with the axial line of the thread and preferably flaring from each other toward the base of the thread groove, as shown. At its crest the thread is slightly arched or rounded to form a crest surface portion having a slight curvature transversely of the thread. This surface portion forms two oppositely facing, transversely curved, helicoidal, thread-locking surfaces 19 and 20, and the general slope of each of these surfaces with reference to the axial line of the thread is preferably within the angle of friction of the bolt and nut material. The highest point of the convex crest surface is midway between the sides of the thread rib and forms the dividing line between the oppositely sloping surfaces 19 and 20, said surfaces merging evenly along the dividing line. At its side edges the crest of the thread rib is more sharply rounded to form transversely curved, helicoidal surface portions 21 merging the locking surfaces 19 and 20 evenly with the side surfaces 17 and 18.

Thread 14 is also formed with two oppositely facing, helicoidal thread-locking root surface portions 22 and 23 in axial register, sloping slightly in opposite directions toward the axial line of the thread from the inner edges of the abutment surfaces 17 and 18, respectively, and meeting midway between adjacent convolutions of the thread rib. The surfaces 22 and 23 are straight in cross section, that is of zero transverse curvature, and the angle which each makes with the axial line of the bolt and its thread should also be sufficiently small to be within and preferably substantially less than the angle of friction of the bolt and nut material. The angle made by the abutment surfaces 17 and 18 with the axial line should be sufficiently great to exceed the said angle of friction. Preferably the bolt and nuts should be formed of metal, although other suitable materials may be used if desired.

The thread 15 of each nut 16 is formed with two oppositely facing, helicoidal abutment surface portions 24 and 25 in axial register and each making an abrupt angle with the axial line of the thread and preferably flaring away from each other toward the base of the thread, as shown. At their crests the threads of the nuts are rounded slightly similarly to the bolt thread to form two oppositely facing, helicoidal thread-locking surface portions 26 and 27. Said surfaces merge evenly at the highest point of the thread rib and slope slightly, with reference to the axial line of the thread, at an angle within the angle of friction of the bolt and nut material. Along its outer corners the thread rib is curved more sharply to form helicoidal surfaces 28 which evenly merge the locking surfaces 26 and 27 with the abutment surfaces 24 and 25. Thread 15 is also formed with two additional, oppositely facing, helicoidal thread-locking surface portions 29 and 30 sloping inward slightly in opposite directions from the abutment surfaces 24 and 25 and meeting midway between adjacent convolutions of the thread rib. The angle of locking surfaces 29 and 30 with reference to the thread axis is also preferably within the angle of friction and the surfaces are straight in cross section, that is of zero transverse curvature.

Abutment surface portions 24 and 25 of the nut thread are opposed to abutment portions 18 and 17, respectively, of the bolt thread and make the same angle with the axial line of the threads; locking portions 26 and 30 of the nut thread are opposed to locking portions 22 and 20, respectively, of the bolt thread; and locking portions 27 and 29 of the nut thread are opposed to locking portions 23 and 19, respectively, of the bolt thread, thus providing coacting pairs of parallel locking surface portions and coacting pairs of parallel abutment surface portions.

The contours of the bolt and nut threads are co-related to permit the threads, while engaged, to assume a neutral position (shown in Fig. 2) in which there is a slight clearance between the thread-locking surface portions on the nut thread 15 and the thread-locking surface portions on the bolt thread 14 which are coactive therewith in order to facilitate initial connection of the nut with the bolt. In this neutral position there is a relatively great clearance between the abutment surface portions of the nut thread and the abutment surface portions of the bolt thread which are coactive therewith, so that the engaged threads may be displaced crosswise of each other a substantial distance in both directions axially of the threads before bringing one or the other set of coactive male and female abutment surface portions into engagement; in other words, the abutment surface portions of the engaged threads are corelated to permit substantial side-play between the threads 14 and 15, and by reason of the great angle they make with the axial line of the threads said abutment surface portions are adapted to limit positively the extent of possible side-play.

Upon screwing a nut on the bolt, the coactive thread-locking surface portions 23 and 27 and the coactive thread-locking surface portions 19 and 29 of the threads 14 and 15 will be first brought into light contact and will co-act to initially advance the nut inward at the pitch rate. Referring to Fig. 1, the two nuts 16 are screwed tightly up against opposite faces of the bolt-penetrated member 12 to clamp the latter between the nuts. The reaction forces generated by the clamping action will, after the nuts engage the member 12, slow down the rate of axial movement of the nuts per turn to less than the pitch rate so that, as the nuts are tightened up, the nut threads will be displaced in opposite directions relatively to the bolt thread until the abutment thread face 25 of the outer nut bears against the abutment surface 17 of the bolt thread, and the abutment surface 24 of the inner nut bears against the abutment surface 18 of the bolt thread. This positively arrests said crosswise displacement with the thread-locking surface portions 19 and 29 and the thread-locking surface portions 23 and 27, respectively, of the bolt and the outer nut jammed into self-locking frictional engagement with each other and with the thread-locking surface portions 20 and 30 and 22 and 26, respectively, of the bolt and inner nut also jammed in self-locking frictional engagement.

When the threads are in said crosswise displaced position, accidental loosening of the nut is impossible since, in the riding-up of the thread-locking surface portions of the nut threads on the thread-locking surface portions of the bolt thread, each nut is very slightly distended or expanded radially, so that the coacting thread-locking surface portions are gripped together under the elastic tension of the expanded nut. As these mutually gripping surface portions of the bolt and nut threads lie within the angle of friction of the surfaces in contact, it will be obvious that they are self-locked or self-held against accidental relative turning and also against accidental sliding toward neutral position even if axial play should develop between the work and the bolt head and nut. It will be obvious also that after the threads assume self-holding position the nut may be still further tightened, if it be necessary or desirable to do so in order to clamp the work with the desired degree of firmness, the abutment surface portions of the bolt and nut threads coacting in this case to advance the nut against the work at the pitch rate without imposing additional stresses on the engaged thread-locking surface portions, so that the nut may be screwed up as firmly as desired, or as the work will permit, without danger of bursting the nut. The thread-locking and abutment surface portions of the threads are corelated to permit full jamming of the coactive locking surface portions, and arrest of the jamming action, by the coactive abutment surface portions within a proper safety limit determined by the elastic limit of the nut.

With a bolt and nut, or any other form of coupled male and female screw elements, provided with threads of the form described, it will be evident that a self-locking action may be obtained whether the threads be displaced crosswise in one direction or the other, thereby affording a jam-locking thread of universal application. It will also be evident that a nut having such a thread will lock on a bolt or other male threaded element no matter which end of the nut be screwed against the work, and whether the nut be screwed toward or from the bolt head against the work. There are many advantageous applications of this double-acting locking thread besides that shown in Fig. 1. Other instances of utility, in which but a single nut and bolt or other pair of male and female screw members are coupled, include insurance of locking of the nut on a bolt in clamping of work on the bolt by a single nut no matter which end of the nut is nearest the bolt head when the nut is screwed on, and the capacity of the nut to lock on a vertical bolt or threaded rod when the nut is used as an adjustable supporting abutment for another member.

Threads of the form shown and described, with thread-locking crest surfaces of rounded form, are easy to cut and reduce to some extent the wear on the cutting tool and formation of burrs in cutting the threads. It will be seen also that a transversely curved locking surface is presented to a coacting locking surface of zero transverse curvature, thus permitting the coacting surfaces to be easily wedged together, and permitting jamming of the surfaces without biting of a sharp edge of either of the telescoping surfaces into the opposed surface so that possible damaging of the coacting jam surfaces from this source is avoided. There is a slight clearance, as shown, between the coactive locking portions of the two threads when in the neutral position, for the purpose heretofore described.

In Fig. 3 is shown a pair of engaged screw threads having coactive abutment portions similar to the abutment portions of threads 14 and 15, but in which all the thread-locking surfaces have a transverse curvature. In this form of thread connection the advantages pointed out in connection with the form shown in Fig. 2 are attained to a greater degree. In this construction the bolt 79 has its thread 80 formed with two oppositely facing, helicoidal abutment surface portions 81 and 82 and the nut 83 has its thread 84 formed with two oppositely facing, helicoidal abutment surfaces 85 and 86 similar to, and coactive in the same manner and for the same purposes as, the abutment surface portions of threads 14 and 15. The top of the thread rib on the nut and the top of the thread rib on the bolt are rounded as in the case of the nut thread 15 in Fig. 2, to provide a convex surface on each rib highest at the medial line of the rib and merging with the adjacent edges of the abutment portions of the rib. The bottom of the thread groove in the nut and the bottom of the thread groove in the bolt are rounded to form a concave surface at the bottom of each groove lowest at the medial line of the groove. The curvature of the concave bottom of each thread groove is made less than the curvature of the opposed convex thread rib top, and the curvature of the bottoms of the bolt and nut thread grooves is such as to provide on each thread a pair of oppositely facing, thread-locking surface portions sloping relatively to the axial line of the thread within the angle of friction of the coactive locking surface portions of the threads, while the curvature of the tops of the bolt and nut thread ribs is such as to provide on each thread a second pair of oppositely facing thread-locking surface portions sloping relatively to the axial line of the thread within said angle of friction, each locking surface portion having a slight curvature transversely of the thread.

The oppositely facing thread-locking surface portions 87 and 88 on the bolt thread (formed by the concave bottom of the bolt thread groove) are adapted to coact with the oppositely facing, thread-locking surface portions 90 and 89, respectively, on the nut thread (formed by the convex top of the nut thread rib), and the oppositely facing thread-locking surface portions 91 and 92 on the nut thread (formed by the concave bottom of the nut thread groove) are adapted to co-act with the oppositely facing thread-locking surface portions 94 and 93 on the bolt thread (formed by the convex top of the bolt thread rib), in the same manner and for the same purposes as the several sets of thread-locking surfaces on threads 14 and 15. Corner surface portions 87$^a$ and 93$^a$, of sharper curvature than the thread-locking root and crest surfaces of the bolt, merge said surfaces evenly with the abutment side surfaces. Similarly, the thread-locking root and crest surfaces of the nut thread are merged with the abutment side surfaces of said thread by curved corner surfaces 89$^a$ and 91$^a$. The greater curvature of the tops of the thread ribs than the opposed bottoms of the thread grooves is of advantage in insuring jamming of the thread-locking surfaces without requiring the greatest precision in cutting the curved surfaces. There is a slight clearance between all the transversely curved, coactive thread-locking surfaces in the neutral position of the threads, as shown.

The thread connection shown in Fig. 4 is precisely like that shown in Fig. 3, except that the bolt thread is of less depth than the nut thread so that there is no contact between the crest surface 96 of the bolt thread and the root surface 95 of the nut thread in any position of the threads. In this construction the bolt 97 has its thread 98 formed with abutment surface portions 99 and 100 similar to abutment portions 81 and 82 in Fig. 3, and thread-locking portions 101 and 102 similar to the locking portions 87 and 88 in Fig. 3; and the nut 103 has its thread 108 formed with abutment portions 104 and 105 similar to abutment portions 85 and 86 in Fig. 3 and thread-locking portions 106 and 107 similar to locking portions 89 and 90 in Fig. 3. It will be obvious that a threaded connection of this kind may be formed in which 97 would represent the nut and 103 the bolt. There is a slight clearance between the coactive thread-locking surfaces in the neutral position of the threads as in the construction shown in Fig. 3.

It will be observed that in each form of thread connection shown and described there is disclosed a construction in which male and female threads are both transversely symmetrical and the female member is reversible upon the male member; in which male and female threads have substantial side-play and one thread is adapted to lock on the other when the threads are displaced crosswise of each other in either direction to take up the side-play in the direction of displacement; in which the engaged threads are adapted to be jammed into self-locking or self-holding frictional engagement by taking up the side-play in either direction without permanent distortion or deformation of the threads, so that the engaged threads may be repeatedly locked and unlocked; in which the coacting locking surfaces of male and female threads slope relatively to the axial line of the threads within the angle of friction of said surfaces; in which locking surfaces on different threads are coactive to screw one member on the other in either of two different directions at the pitch rate until the traveling member meets resistance sufficient to displace the engaged threads crosswise of each other; and in which the engaged threads have abutment portions coactive to limit positively the extent of permissible side-play between the threads in both directions and arranged to arrest side-play after self-locking of the coactive locking surface portions and before the jamming action of the active locking surface portions generates bursting stress exceeding the elastic limit of the nut, said coacting abutment surface portions being disposed sufficiently abruptly to the axial line of the threads to form positive side-play-limiting stops and having sufficient depth to withstand great axial load stresses and also being coactive to advance a nut on the bolt against the work at the pitch rate after jamming of the threads into self-holding relation.

It will be observed also that, in the forms of thread connection shown in Figs. 1 to 3, not only is the double-acting or reversible locking effect obtained but, whether the locking effect be obtained by thread displacement in one direction or the other, a male thread and a female thread are locked together along two different helicoidal surface portions on each thread,—that is, in each locking effect the male and female threads have a double self-holding bind on each other; whereas, in the form of thread connection shown in Fig. 4 the male and female threads are coactive to attain the double-acting or reversible locking effect between the threads, but, in each locking effect, the two threads are locked together along only one helicoidal surface portion on each thread,—that is, in each locking effect the male and female threads have a single self-holding bind on each other.

While the abutment surface portions in the several forms of thread connections are shown as of zero curvature transversely of said surface portions, they may be curved transversely, if desired; and abutment surface portions of zero curvature perpendicular to the axial line of the thread may be employed, if desired.

What I claim is:

1. In combination, two members screw threaded for coupling and uncoupling, characterized in that said members are provided with a pair of coupling threads of equal and constant pitch having symmetrical profiles and sufficient space between the thread convolutions to permit substantial crosswise displacement between the coupling threads while they are screwed together, the symmetrical thread profiles being such that each thread has two steep sides extending from a transversely symmetrical and slightly concave thread root to a transversely symmetrical convex thread crest curved from one of said steep sides to the other and that the threads have a clearance which permits free screwing of the coupled threads when relatively centered one in the other and permits the curved convex crest of at least one of said threads to be wedged on the slightly concave root of the other thread when the threads are crosswisely displaced in either direction from central free screwing relation into side face engagement, whereby the members are screwable together either end first and their coupled threads are wedgeable into side engagement and frictionally locked crest and root engagement by crosswise displacement in either direction.

2. In combination, two members screw threaded for coupling and uncoupling, characterized in that they are provided with a pair of coupling screw threads of equal and constant pitch and symmetrical profile having space between their convolutions for substantial crosswise displacement of the threads while coupled and also each having a transversely curved convex crest surface and a transversely curved concave root surface connected by two thread side faces, the clearance of the threads and the relative curvature of the thread crests and roots being such as to permit wedging of the threads at the crest and root of both threads when the threads are crosswisely displaced in either direction into side face contact from a relatively crosswisely centered relation and to permit the threads to be freely screwed together and apart when in the last-mentioned relation, and each of the side faces of both threads making an angle of the same amplitude with the thread axis, which angle is of sufficient magnitude to prevent wedging of the side faces of either thread upon those of the other thread.

In testimony whereof I hereunto affix my signature.

WILLIAM E. HOKE.